Sept. 23, 1969　　　　J. FROHLICH　　　　3,468,564
TURNING CONNECTION FOR PIPES UNDER PRESSURE
Filed Nov. 21, 1967　　　　　　　　　　　2 Sheets-Sheet 1
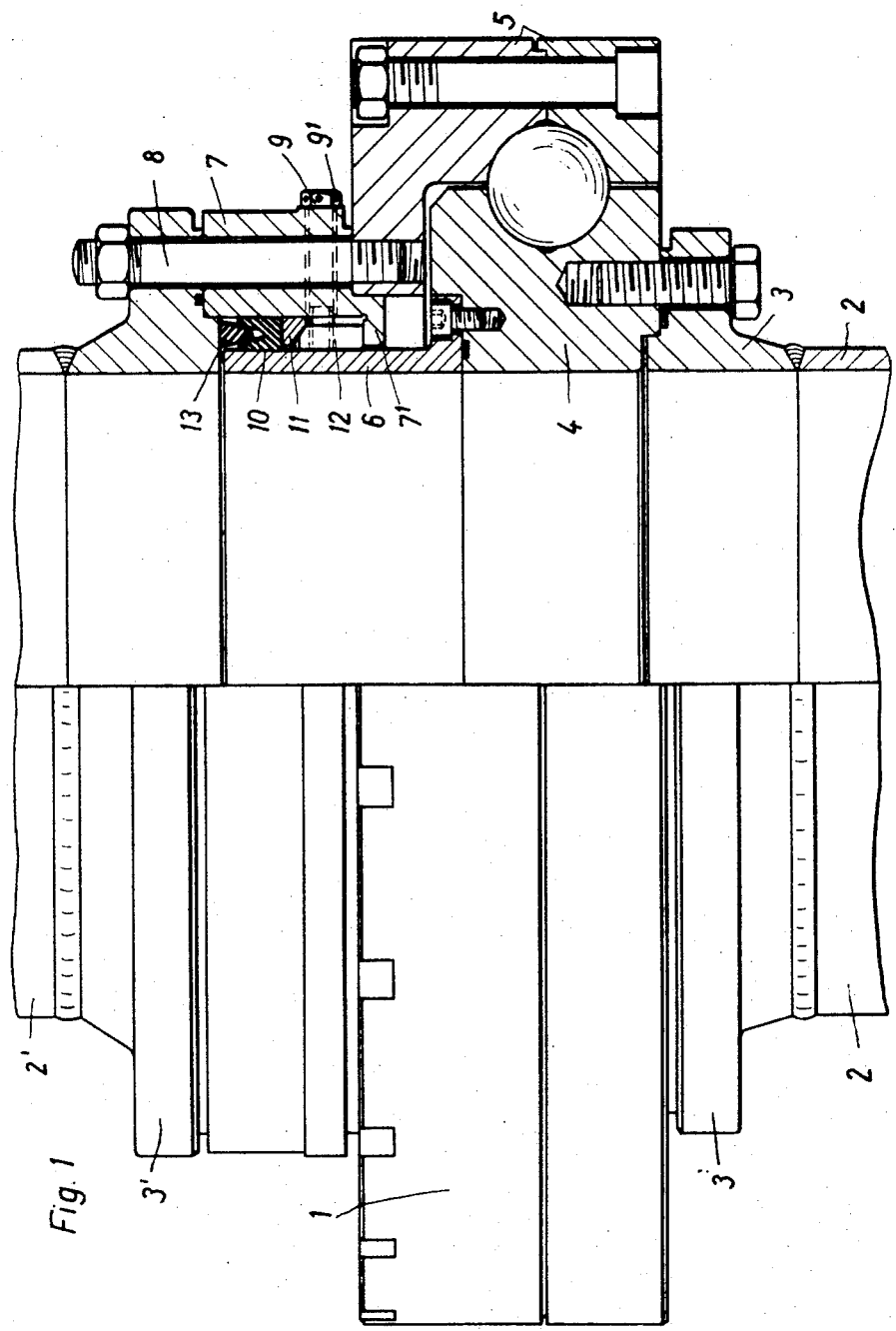
Inventor:
JOSEF FRÖHLICH
BY:

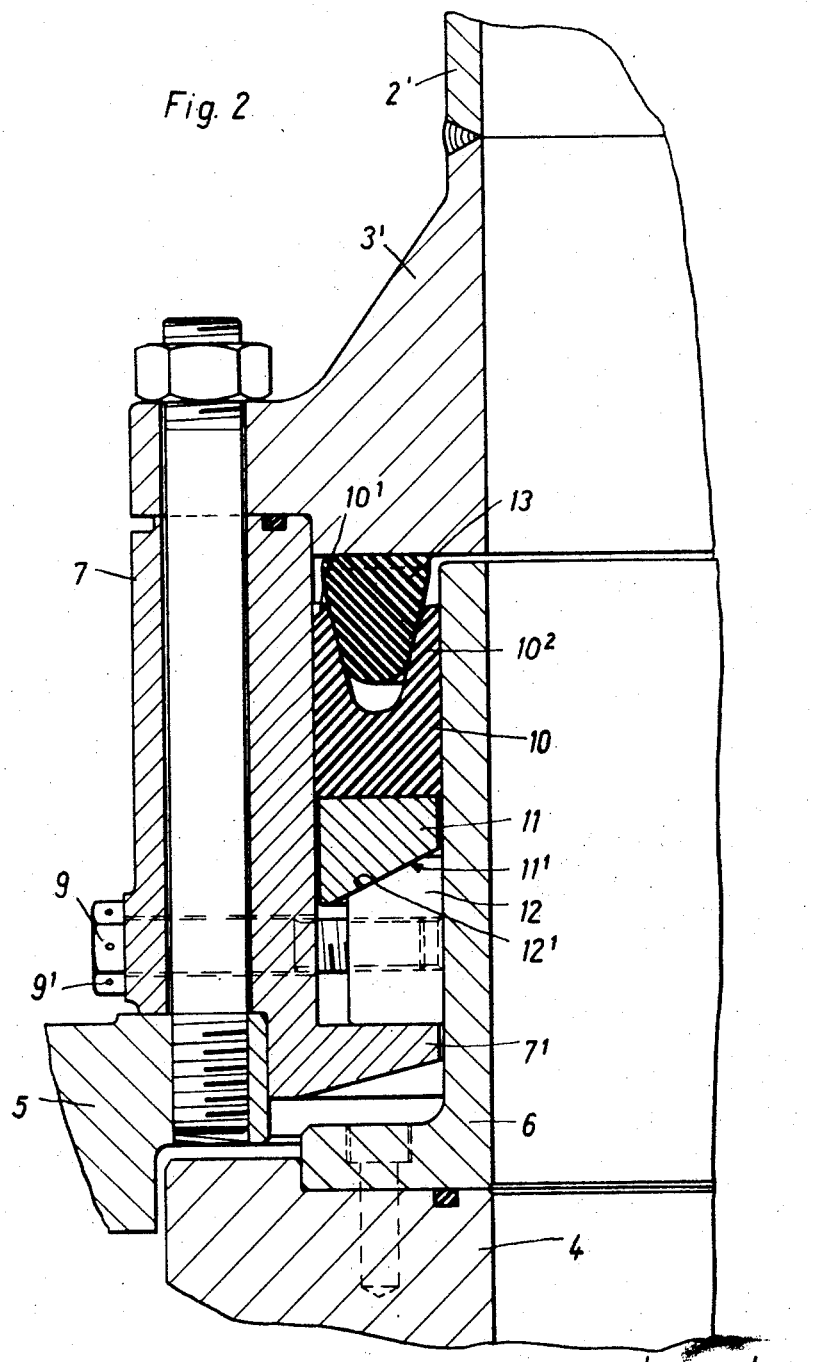

3,468,564
TURNING CONNECTION FOR PIPES
UNDER PRESSURE
Josef Fröhlich, Dusseldorf, Germany, assignor to Mannesmann Aktiengesellschaft, Dusseldorf, Germany
Filed Nov. 21, 1967, Ser. No. 684,815
Claims priority, application Germany, Dec. 9, 1966,
M 71,947
Int. Cl. F16b 7/00; F16d 1/00
U.S. Cl. 285—111     3 Claims

ABSTRACT OF THE DISCLOSURE

A turning connection for pipes under internal pressure which may be adjusted without releasing the pressure. The connection essentially consists of a bearing assembly, whose inner bearing part is attached to one pipe end and whose outer bearing part is attached to the other pipe end, each by a retaining ring. A gasket is disposed between the two retaining rings in adjustable manner and abuts on a thrust collar which in turn is supported by wedge pieces, uniformly disposed about the bearing periphery. The wedge pieces are vertically displaceable relative to the movement of the thrust collar by the action of set screws assigned to each of the wedge pieces.

---

The invention relates to a turning connection for pipes which are under internal pressure, consisting of a roller bearing assembly whose bearing interior is connected to one pipe end and whose exterior is connected to the other pipe end, both by way of retaining rings; and of a gasket disposed on the interior bearing part and between the retaining rings. In particular, the invention relates to the construction of the gasket.

In conventional turning connections, the gasket must be replaced when a leak occurs. This requires loosening of the turning connection and separation of the pipe ends to such an extent that the outer retaining ring can be removed.

It is the object of the invention to render the gasket of the turning connection adjustable in such a fashion that it may be adjusted when a leak occurs without disconnecting the joint so that, when required, adjustment can be carried out while maintaining the internal pressure.

According to the invention, the turning connection consists of a bearing arrangement whose inner bearing part is attached to one pipe end and whose outer bearing part is attached, by way of an exterior retaining ring, to the other pipe end, an interior retaining ring overlapping the exterior one and fastened to the inner bearing part; and a gasket adjustably disposed between the two retaining rings. The rear side of the gasket abuts on an axially displaceable thrust collar, and the latter is supported by means of oblique sliding planes by a plurality of wedge pieces, uniformly distributed about the periphery; the wedge pieces rest on an abutment disposed on the exterior retaining ring. The wedge pieces are displaceable vertically relative to the direction of movement of the thrust collar under the action of a set screw assigned to each piece.

In a preferred embodiment of the invention, the gasket has a U-shaped cross section whose tapering shanks lie against the inner and outer retaining rings and are kept apart by a wedge-shaped expansion ring. The latter preferably is of the same material as the gasket to assure uniform expansion of these two component parts.

The invention now will be more fully explained with reference to the accompanying drawings. However, it should be understood that these are given merely by way of illustration, and not of limitation, and that it is intended to cover all modifications and variations which do not constitute a departure from the spirit and the scope of the invention as hereinafter claimed.

In the drawings,
FIG. 1 is an elevation of the device, partly in section; and
FIG. 2 is an enlarged section of part of FIG. 1.

Referring now to these drawings, two pipe ends 2, 2' are shown in FIG. 1, connected to each other by a turning connection 1 without narrowing the flow diameter of these pipes. Both pipe ends, 2 and 2', are provided with blank flanges 3, 3'.

The turning connection 1 is a roller bearing assembly having an inner bearing part 4 and an outer bearing part 5 which is divided laterally to the bearing axis. An inner retaining ring 6 is connected to the inner part 4. The connection of the outer part 5 with blank flange 3' is made by an outer retaining ring 7 which encloses inner retaining ring 6, and these components 3', 5 and 7 are held in place by a bolt and nut assembly 8. Outer retaining ring 7 has an inwardly protruding lug $7^1$. Sealing is accomplished by gasket 10 which is supported, by way of thrust collar 11 and wedge pieces 12, by lug $7^1$. Set screws 9, offset relative to bolt 8, engage in the wedge pieces 12. The latter move in the direction of outer retaining ring 7 upon turning of set screws 9 and urge thrust collar 11 against gasket 10 whose U-shaped shanks interconnected by a web section. The web section is disposed adjacent the front surface of the thrust collar 11. The shanks are pressed against the outer and inner retaining rings 7 and 6, respectively, by means of an expansion ring 13.

FIG. 2 shows the details of the adjustable gasket in an enlarged partial section. The set screws 9 are provided with bores $9^1$ in their heads through which, e.g., a wire can be threaded in order to prevent accidental tightening or adjustment of only one set screw 9. It is evident that all set screws must be turned to an equal degree upon adjustment.

Between shanks $10^1$, $10^2$ of the gasket 10, expansion ring 13 is disposed. The rear side of thrust collar 11 has a sliding plane $11^1$. When adjusting the gasket, the sliding planes $12^1$ of the wedge pieces 12 slide on the sliding plane $11^1$ of the thrust collar 11.

I claim as my invention:
1. A turning connection for use with two pipes under internal pressure, which comprises, in combination, a bearing having an inner and an outer bearing part; an outer retaining ring on said outer bearing part adapted for connecting the same to the end of a first pipe; an inner retaining ring connected to the inner bearing part and adapted for connecting the same to the end of a second pipe; a gasket adjustably disposed between said inner and outer retaining rings; an axially displaceable thrust collar having a front surface operable to exert pressure against said gasket and a rear surface oblique relative to said front surface and inclined inwardly relative to the bearing interior; a plurality of wedge pieces uniformly distributed about the bearing periphery and each provided with an oblique sliding plane corresponding to that of said rear surface of said thrust collar; said rear surface of said thrust collar being supported by said wedge pieces and a lug disposed on said outer retaining ring supporting said wedge pieces; a set screw assigned to each of said wedge pieces moving the same laterally outwardly relative to said bearing, thereby moving said thrust collar upon actuation to exert pressure against said gasket.

2. The turning connection as defined in claim 1 wherein said gasket is of substantially U-shaped cross section, the web of the U-shape thereof being supported by said front surface of said thrust collar; the shanks of said gasket tapering; a wedge-shaped expansion ring inserted between the shanks, thus spreading said shanks so that they come to rest on the outer and inner retaining ring, respectively, when said thrust collar presses said gasket.

3. The turning connection as defined in claim 2, wherein said expansion ring and said gasket are of like material.

References Cited

UNITED STATES PATENTS

| | | | |
|---|---|---|---|
| 959,378 | 5/1910 | O'Neill | 285—270 |
| 1,908,844 | 5/1933 | Holtson | 285—276 |
| 1,949,961 | 3/1934 | Hansen | 285—348 X |
| 2,396,123 | 3/1946 | Phillips | 285—276 X |
| 2,509,118 | 5/1950 | Warren | 285—276 X |
| 2,775,472 | 12/1956 | Brown | 285—348 X |
| 2,927,804 | 3/1960 | Snyder et al. | 285—276 X |
| 3,301,567 | 1/1967 | Barr | 285—348 X |

THOMAS F. CALLAGHAN, Primary Examiner

U.S. Cl. X.R.

285—276, 339, 348